(12) United States Patent
Reinås et al.

(10) Patent No.: US 11,708,737 B2
(45) Date of Patent: Jul. 25, 2023

(54) WELLHEAD ASSEMBLY

(71) Applicant: Equinor Energy AS, Stavanger (NO)

(72) Inventors: Lorents Reinås, Stavanger (NO); Tore Geir Wernø, Sandnes (NO); Harald Sigurd Nesse, Sandnes (NO)

(73) Assignee: EQUINOR ENERGY AS, Stavanger (NO)

(*) Notice: Subject to any disclaimer, the term of this patent is extended or adjusted under 35 U.S.C. 154(b) by 2 days.

(21) Appl. No.: 16/334,945

(22) PCT Filed: Sep. 20, 2017

(86) PCT No.: PCT/NO2017/050238
§ 371 (c)(1),
(2) Date: Mar. 20, 2019

(87) PCT Pub. No.: WO2018/056834
PCT Pub. Date: Mar. 29, 2018

(65) Prior Publication Data
US 2020/0024926 A1    Jan. 23, 2020

(30) Foreign Application Priority Data

Sep. 20, 2016  (GB) ..................... 1616004

(51) Int. Cl.
*E21B 33/038* (2006.01)
*E21B 43/10* (2006.01)
(Continued)

(52) U.S. Cl.
CPC .......... *E21B 33/03* (2013.01); *E21B 33/0415* (2013.01); *E21B 33/064* (2013.01); *E21B 43/10* (2013.01); *E21B 2200/01* (2020.05)

(58) Field of Classification Search
None
See application file for complete search history.

(56) References Cited

U.S. PATENT DOCUMENTS

| 4,564,068 A * | 1/1986 | Baugh ................... E21B 33/043 |
| | | 166/123 |
| 8,783,362 B2 * | 7/2014 | Adamek ................. E21B 17/07 |
| | | 166/346 |

(Continued)

FOREIGN PATENT DOCUMENTS

| GB | 2 198 768 | 6/1988 |
| GB | 2 229 235 | 9/1990 |
| GB | 2497409 | 6/2013 |

OTHER PUBLICATIONS

International Search Report and Written Opinion of the International Searching Authority dated Nov. 27, 2017 in International (PCT) Application No. PCT/NO2017/050238.

(Continued)

*Primary Examiner* — Matthew Troutman
*Assistant Examiner* — Douglas S Wood
(74) *Attorney, Agent, or Firm* — Wenderoth, Lind & Ponack, L.L.P.

(57) ABSTRACT

A wellhead is provided. The wellhead comprises a high pressure wellhead housing; a casing hanger assembly located within the high pressure wellhead housing; and a casing supported on the casing hanger assembly. The casing hanger assembly is arranged so that the casing is able to move relative to the high pressure wellhead housing. This may be to accommodate well growth experienced by the wellhead during use.

17 Claims, 4 Drawing Sheets

Figure 1:
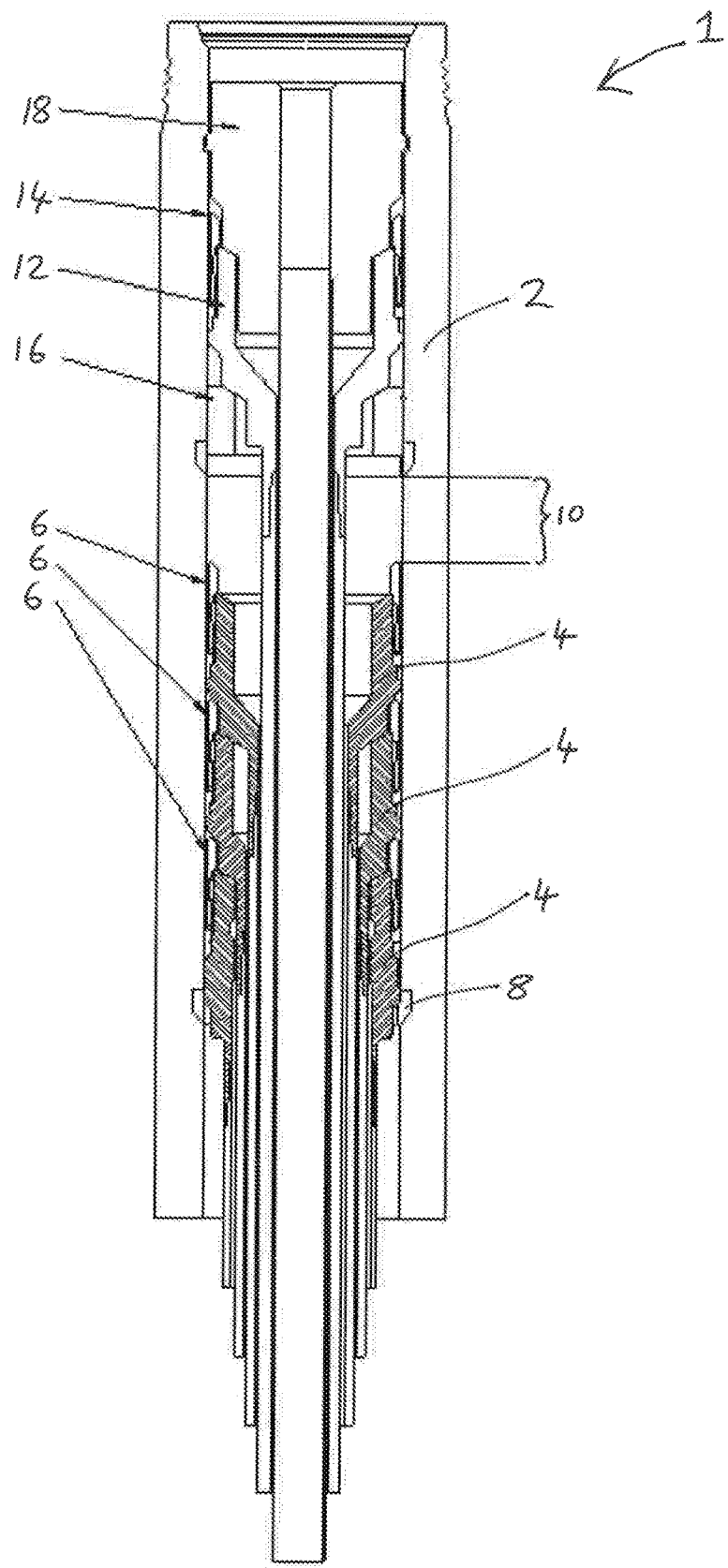

(51) Int. Cl.
*E21B 17/01* (2006.01)
*E21B 33/03* (2006.01)
E21B 33/04 (2006.01)
E21B 33/064 (2006.01)

(56) References Cited

U.S. PATENT DOCUMENTS

| | | | | |
|---|---|---|---|---|
| 2006/0196673 A1* | 9/2006 | Pallini | ............... | E21B 33/038 |
| | | | | 166/368 |
| 2010/0116489 A1* | 5/2010 | Nelson | ............... | E21B 33/04 |
| | | | | 166/182 |
| 2010/0243238 A1* | 9/2010 | Gette | ............... | E21B 33/04 |
| | | | | 166/208 |
| 2011/0067880 A1* | 3/2011 | Adamek | ............... | E21B 17/01 |
| | | | | 166/345 |
| 2014/0251634 A1* | 9/2014 | Curtiss | ............... | E21B 33/0422 |
| | | | | 166/368 |
| 2015/0267479 A1* | 9/2015 | Benson | ............... | E21B 33/068 |
| | | | | 166/85.3 |
| 2016/0069149 A1* | 3/2016 | Borak, Jr. | ............... | E21B 33/03 |
| | | | | 166/387 |

OTHER PUBLICATIONS

Search Report dated Dec. 21, 2016 in corresponding Great Britain Application No. GB1616004.6.

* cited by examiner

WELLHEAD ASSEMBLY

The invention relates to a wellhead assembly. For example a wellhead assembly that is designed to be able to accommodate thermal growth.

A conventional type of wellhead assembly comprises a series of stacked casing hangers inside a high pressure wellhead housing. Each casing hanger supports a sequentially smaller nominal diameter casing section/pipe which enables the well to reach deeper and deeper for each casing section whilst providing structural support of the wellbore.

Most commonly the casing hangers are fixed to the wellhead and the annulus created between two subsequent casing sections is sealed off inside the wellhead by means of a pack-off element/assembly which, in addition to sealing the annulus, also fixes the casing hanger to the high pressure wellhead housing.

Well growth is a well-known phenomenon in wellhead assemblies. This phenomenon is typically caused by the expansion of the casing elements that have been heated up, for example by the well bore fluid, reservoir and/or geothermal gradients. The casing elements tend to expand upwards away from the reservoir. The heat is transmitted from the production tubing in the centre of the well out through the casings and casing hangers. Factors governing the resulting well growth include (but are not limited to) temperature, material properties, length of casing, amount and/or quality of cement, quality of bond to the formation, formation property (e.g. formation stiffness) and free casing weight. The net generated longitudinal expansion of the stacked casings may cause the wellhead assembly to rise above its original installation level.

In cases with moderate expected well growth the wellhead assembly may be restricted from "growing" by the surrounding supporting structure. In such a case any expansion and forces are accommodated within the well system. For systems where the well growth cannot be constrained and/or accommodated by the supporting structure the resulting growth is typically accommodated through flexible pipe spools connecting the well system to the surrounding infrastructure. This prevents or minimises the risk of the well growth causing structural failure. There would be however an advantage in having alternative ways in which to accommodate well growth.

In a first aspect the present invention provides a wellhead assembly, the wellhead assembly comprising: a high pressure wellhead housing; a casing hanger assembly located within the high pressure wellhead housing, and a casing supported by the casing hanger assembly; wherein the wellhead assembly is arranged so that the casing is able to move relative to the high pressure wellhead housing. This may be to accommodate well growth experienced by the wellhead assembly during use. This movement may be axial movement. The movement may be allowed after the assembly is installed and/or during use of the wellhead assembly.

For example, the present invention may provide a wellhead assembly, the wellhead assembly comprising: a high pressure wellhead housing; and a casing hanger assembly located within the high pressure wellhead housing, wherein the casing hanger assembly is arranged/configured so that it allows relative movement between the high pressure wellhead housing and the casing.

The wellhead assembly may be arranged so that the casing and/or casing hanger assembly is able to move relative to the high pressure wellhead housing. The relative movement may allow the assembly to accommodate well growth experienced by the wellhead assembly (e.g. the casing) during use.

The casing being able to move relative to the high pressure wellhead housing may additionally or alternatively be advantageous for reasons other than to accommodate well growth. For example, it may be useful to have a wellhead assembly that is arranged so that the casing is able to move relative to the high pressure wellhead housing during other procedures such as pressure testing, installation and/or retrieval. The relative movement of the casing and the high pressure well may accommodate growth and/or shrinkage of the well.

The wellhead assembly may be able to accommodate at least some or all of the well growth and/or shrinkage experienced by the wellhead assembly during use.

The casing may be able to freely move relative to the high pressure wellhead housing.

The casing and/or casing hanger assembly may not be locked relative to the high pressure wellhead housing. This may mean that the casing and/or casing hanger assembly can move a considerable distance and/or freely in at least one direction relative to the high pressure wellhead housing. The assembly may be arranged so that the casing can move repeatedly in opposite directions relative to the high pressure wellhead housing, for example as the well heats and cools or vice versa. The casing (and associated casing hanger assembly) may move cyclically relative to the high pressure wellhead housing.

Normally in known systems the casing and/or casing hanger assembly would be locked relative to the high pressure wellhead housing. This may mean that the casing and/or casing hanger assembly cannot move (i.e. any considerable distance) relative to the high pressure wellhead housing and instead there may only be slight relative movements between the casing and the high pressure wellhead housing but not a sufficient amount to accommodate for well growth to any significant extent.

The wellhead assembly may be arranged to allow considerable movement between the casing and the high pressure wellhead housing. Thus, the wellhead assembly may be arranged to not only tolerate slight relative movement (i.e. movement that cannot be prevented with a locking mechanism), it may be designed to allow significant and/or unconstrained movement between the casing and the high pressure wellhead housing.

The casing may be able to move relative to the high pressure wellhead housing by at least 1 cm, at least 5 cm, or about 6 to 10 cm. In a more extreme case the distance of travel may even be up to or greater than 1 m for example. There may be no limit on the distance of travel of the casing relative to the high pressure housing other than that imposed by the size of the gap/void into which the casing and/or associated casing hanger assembly (if it moves) can move.

The amount of relative movement between the casing and the high pressure wellhead housing that would be experienced in a system in which the casing is entirely unconstrained relative to the high pressure wellhead housing may be calculated. The wellhead assembly may be designed and/or arranged so that the casing is able to move relative to the high pressure wellhead housing by a distance that is equal to or greater than the amount of relative movement between the casing and the high pressure wellhead housing that would be experienced in a system in which the casing is entirely unconstrained relative to the high pressure wellhead.

The casing hanger assembly may be arranged/configured so that in use the casing hanger assembly (e.g. casing hanger of the casing hanger assembly) can move relative to the high pressure wellhead housing and/or so that in use the casing can move relative to the casing hanger assembly (e.g. casing hanger of the casing hanger assembly).

The casing hanger assembly that allows relative movement between the high pressure wellhead housing and the casing may be referred to as a dynamic casing hanger assembly.

The dynamic casing hanger assembly may comprise a casing hanger that can itself move relative to the high pressure wellhead housing (which may be referred to as a dynamic casing hanger) so as to allow the casing supported therefrom to also move relative to the high pressure wellhead housing. Additionally or alternatively, the dynamic casing hanger assembly may allow the casing it is supporting to move relative to the casing hanger of the casing hanger assembly.

The casing hanger assembly may comprise a static/fixed casing hanger (e.g. a casing hanger that is locked to the high pressure wellhead housing). The casing hanger assembly may be arranged/configured so that in use the casing can move relative to the casing hanger assembly (e.g. casing hanger of the casing hanger assembly). For example, there may be a dynamic interface between the casing and the casing hanger assembly (e.g. casing hanger of the casing hanger assembly) that allows the two parts to move relative to each other. There may be void/volume in the assembly (such as within the casing hanger itself) into which the casing can move to allow relative movement between the casing hanger assembly and the casing. The amount of movement that can be accommodated may be determined by the length of the void. The casing hanger of the casing hanger assembly may have an internal moving bit (e.g. with an internal seal) to allow relative movement between the casing and the casing hanger.

The casing hanger assembly (e.g. casing hanger of the casing hanger assembly) may be attached to the casing by a flexible material (such as an elastomeric material such as rubber or an elastomer). In this case the movement between the casing hanger assembly and the casing may be possible by use of materials with significantly lower Young's modulus than standard casing/hanger materials. For example, the void/volume may be filled with a flexible material such as rubber, that allows relative movement between the casing hanger assembly (e.g. casing hanger of the casing hanger assembly) and the casing.

The casing hanger assembly may be arranged/configured so that when the wellhead assembly (e.g. the casing) is subjected to changes in temperatures (e.g. rises in temperature) the casing can move (e.g. expand upwards in a vertical direction away from the reservoir) relative to the high pressure wellhead housing. This may be achieved by the casing hanger assembly moving relative to the high pressure wellhead housing and/or the casing moving relative to its respective casing hanger assembly (e.g. casing hanger of the casing hanger assembly).

This relative movement may be to accommodate expansion and/or contraction of components of the wellhead assembly, such as one or more casing. This expansion and/or contraction may be due to changes in temperature experienced by the wellhead assembly and/or due to pressure testing for example.

The movement of a casing relative to the high pressure wellhead housing may relieve at least some of the stresses in the wellhead assembly caused for example by temperature changes and/or thermal growth and/or that are experienced during other operations such as pressure testing, installation and/or retrieval of the assembly.

The casing hanger assembly may comprise one or more of a casing hanger, a pack-off element and a seal.

The casing hanger may support the casing. The pack off element may be located between the casing hanger and the high pressure wellhead housing. The pack off element may be used to seal and/or fix the casing hanger to the high pressure wellhead housing. The seal may be part of the pack-off element. The seal may be used to seal the casing hanger to the high pressure wellhead housing.

Well growth may also be referred to as thermal growth. Thermal growth may occur due to expansion and/or contraction of components of the well as a result of changes in temperature.

When the casing hanger assembly is arranged so that it can move relative to the high pressure wellhead housing there may be a dynamic interface between the dynamic casing hanger/casing hanger assembly and the high pressure wellhead housing. The dynamic interface between the dynamic casing hanger/casing hanger assembly and the high pressure wellhead housing may be provided by the pack-off element and/or the seal of the casing hanger assembly. The wellhead assembly may be for and/or part of a well.

The high pressure wellhead housing may be a single component or a part made from several components/pieces fixed together.

The well may be an oil and gas well.

The well may be a subsea well. The well may be a surface well.

The well may be a production well, an exploration well and/or injection well for example. Thermal growth may be more significant in production wells as this type of well may experience greater changes in temperature when in use. As a result the present invention may be particularly applicable to production wells.

Cooling may be experienced in certain types of injection wells. This may be an injection well that will apply cooling of the casing/tubing steels during use (injection).

Due to cooling, the casings may contract. This may be accommodated by allowing the casing (and optionally also the associated casing hanger assembly) to move relative to the high pressure wellhead housing be allowed to move in an opposite direction compared to what is experienced during expansion. This may for example occur during injection of liquid $CO_2$ into subsurface reservoirs. This may be for the purpose of carbon capture and storage.

The lengths of the casings pipe may be chosen such that the casings hangers would reside above each other with a planned void size (i.e. planned strokelength). In this case, as cold injection starts the casing hangers may be able to move in a downward direction into the void allowing the casing strings to shrink in length.

It has been found that thermal growth may be appropriately and/or sufficiently accommodated for by allowing at least one casing in the wellhead assembly to move relative to the high pressure wellhead housing.

The casing hanger assembly may be coaxial with the high pressure wellhead housing.

The casing may be allowed to move in an axial direction within the high pressure wellhead housing (e.g. within or with the casing hanger assembly), i.e. in a direction along the length of the high pressure wellhead housing. This direction may be a vertical direction, e.g. a direction away from or towards the reservoir.

The casing hanger assembly may seal to the high pressure wellhead housing. There may be a seal between the casing hanger and the high pressure wellhead housing. The seal may be a dynamic seal. This may mean that the seal can accommodate relative movement between the casing hanger and the high pressure wellhead housing.

The casing may seal to the casing hanger of the casing hanger assembly. There may be a seal between the casing hanger and the casing. The seal may be a dynamic seal. This may mean that the seal can accommodate relative movement between the casing hanger assembly (e.g. casing hanger of the casing hanger assembly) and the casing.

The casing hanger assembly may be sealed to the high pressure wellhead housing by a pack-off assembly (which may be referred to as a pack-off element). The pack-off assembly may comprise a seal. If the casing hanger assembly can move relative to the high pressure wellhead housing, the pack off assembly may be referred to as a dynamic pack-off assembly. This is because in this case the pack off assembly may allow relative movement between the casing hanger and the high pressure wellhead housing.

The movement may be slow and/or low frequency movement.

The seal (e.g. the seal between the casing hanger assembly and high pressure wellhead housing and/or the seal between the casing hanger and the casing) and/or the pack-off element may be dynamically tolerant. This may mean that these components allow and are tolerant to relative movement between the casing hanger and the high pressure wellhead housing or the casing hanger and the casing whilst still allowing a seal to be maintained between the two components.

The seal (e.g. the seal between the casing hanger assembly the and high pressure wellhead housing and/or the seal between the casing hanger and the casing) may be a dynamically tolerant seal. This may mean that it is a seal which will seal even during and/or after it has experienced relative movement between the surface it is sealing.

The seal may be an elastomeric seal and/or a metal-to-metal seal.

The wellhead assembly, particularly when the production casing hanger assembly is a dynamic casing hanger assembly, may comprise a sealing sub. This sealing sub may seal, e.g. by a metallic seal, to the high pressure wellhead housing. The sealing sub may act as a dummy casing hanger. The sealing sub may be used in order to provide the required number of independent seals in the wellhead assembly.

There may be a space/void (which may for example be an annular space/void) that permits relative movement between the casing and the high pressure wellhead housing. The space/void may be within the high pressure wellhead housing of the wellhead assembly (e.g. above the casing hanger assembly) and/or within the casing hanger assembly (e.g. casing hanger of the casing hanger assembly).

The amount of relative movement that is permitted between the casing and the high pressure wellhead housing may be equal to and/or determined by the length of the space/void. In other words the casing may move relative to the high pressure wellhead housing until a component, such as the casing itself or the casing hanger that supports the casing reaches an end of the space/void.

The void/space may be referred to as a well growth expansion space.

In the case of a dynamic casing hanger assembly, the dynamic casing hanger assembly may move into the space/void when the casing hanger assembly moves relative to the high pressure wellhead housing to accommodate well growth. The well growth expansion space may be adjacent to, above and/or within the casing hanger.

The void/space may be dimensioned so that the casing is able to move relative to the high pressure wellhead housing by a distance that is equal to or greater than the amount of relative movement between the casing and the high pressure wellhead housing that would be experienced in a system in which the casing is entirely unconstrained relative to the high pressure wellhead.

The well growth expansion space may be between the (one or more) dynamic casing hanger assembly(ies) and the production equipment such as the tubing hanger or Christmas tree (which may be referred to as a Xmas tree). The well growth expansion space may be above or below the production casing hanger assembly.

The tubing hanger assembly, if present, may be fixed to the high pressure wellhead housing.

Additionally or alternatively, the tubing hanger assembly, if present, may be fixed to a tubing head spool located above the high pressure wellhead housing.

The tubing hanger assembly, if present, may be fixed to a Horizontal Christmas tree located above the high pressure wellhead housing.

The wellhead assembly may comprise a plurality of casings. In this case, at least one, a plurality, or all of the casings may be able to move relative to the high pressure wellhead housing (e.g. by relative movement between the respective casing hanger assembly (e.g. casing hanger of the casing hanger assembly) and the high pressure wellhead housing and/or by relative movement between the casing and its respective casing hanger). The casings that can move relative to the high pressure wellhead housing may all move together or may be able to move independently of each other.

The wellhead assembly may comprise a plurality of casing hanger assemblies. In this case, at least one, a plurality, or all of the casing hanger assemblies may be arranged so that the casing it supports can move relative to the high pressure wellhead housing (e.g. by relative movement between the casing hanger and the high pressure wellhead housing and/or by relative movement between the casing and its respective casing hanger). The casing hanger assemblies that can move relative to the high pressure wellhead housing may each be referred to as a dynamic casing hanger assembly. Any casing hanger assembly that cannot move relative to the high pressure wellhead housing may be referred to as a fixed casing hanger assembly.

For example, the wellhead assembly may comprise three intermediate casing hanger assemblies that are all dynamic casing hanger assemblies (i.e. allow relative movement between the casing and the high pressure wellhead housing) and a production casing hanger assembly that is a fixed casing hanger assembly.

The well growth expansion space may be adjacent to, above, below and/or within the dynamic casing hanger assembly.

In the case of the wellhead assembly having a plurality of dynamic casing hanger assemblies, the well growth expansion space may be adjacent to and/or above the uppermost dynamic casing hanger assembly (i.e. the casing hanger assembly furthest from the reservoir that can itself move relative to the high pressure wellhead housing).

In the case of a wellhead assembly with a plurality of dynamic casing hanger assemblies, two or more or all of the dynamic casing hanger assemblies may be stacked on (i.e. resting on each other) each other within the high pressure wellhead housing.

One casing hanger assembly may be supported, at least in part, by a landing shoulder (which may be referred to as a load shoulder).

In the case of a wellhead assembly with a plurality of casing hanger assemblies, one or more casing hanger assembly(ies) may be stacked on (i.e. supported by) the casing hanger assembly that is landed on the landing shoulder.

The casing hanger assemblies that are stacked together may all be dynamic casing hanger assemblies and may be arranged so that they all allow relative movement between the respective casing and the high pressure wellhead housing (e.g. can all move (and for example move together) relative to the high pressure wellhead housing and/or allow movement between the supported casing and the casing hanger).

The casing hanger assemblies in a stack (if present) may be arranged to all move together relative to the high pressure wellhead housing in response to thermal growth.

In the case of a wellhead assembly with a plurality of casing hanger assemblies that can move relative to the high pressure wellhead housing, the casing hanger assemblies may be able to each move relative to the high pressure wellhead housing independently of each other.

The casing hanger assembly supported by and/or landed on the landing shoulder may be the lowermost casing hanger assembly (i.e. the casing hanger assembly that is closest to the reservoir).

In the case of a wellhead assembly with a plurality of casing hanger assemblies, each casing hanger may be sealed to the high pressure wellhead housing by its own respective pack-off assembly. Each dynamic casing hanger may have a respective dynamic pack-off assembly.

The wellhead assembly may comprise one or more, or a plurality of intermediate casing hanger assemblies. One, a plurality, or all of the intermediate casing hanger assemblies may be arranged so that its respective casing can move relative to the high pressure wellhead housing e.g. to accommodate thermal growth, i.e. one, a plurality, or all of the intermediate casing hangers may be a dynamic casing hanger and/or one, a plurality, or all of the intermediate casing hanger assemblies may allow the casing to move relative to its respective casing hanger.

When the casing hanger/casing hanger assembly is an intermediate casing hanger/intermediate casing hanger assembly, the landing shoulder may be referred to as an intermediate casing hanger landing device. This landing shoulder may be referred to as a lower landing shoulder.

Intermediate casings (i.e. casings supported by intermediate casing hangers) may experience the greatest amount of well growth and thus by allowing these casing sections to rise within the high pressure wellhead housing thermal growth of these casings may not cause any change of the high pressure wellhead datum.

The wellhead assembly may comprise a production casing hanger assembly. The production casing hanger assembly may be fixed relative to (e.g. locked to) the high pressure wellhead housing. Thus, the production casing hanger (that is part of the production casing hanger assembly) may be a fixed casing hanger. The advantage of having a production casing hanger as a fixed casing hanger is that it can be fixed/locked in a certain position relative to the top of the high pressure wellhead housing. This allows the wellhead assembly to have a standard interface toward the completion system (which may for example comprise the tubing, tubing hanger and/or Christmas tree). For example, a tubing hanger may be received in the production casing hanger.

Also, in the case that the production casing hanger assembly is fixed relative to (e.g. locked to) the high pressure wellhead housing, this casing hanger assembly (e.g. static casing hanger assembly) may have a more reliable seal than the one or more dynamic casing hanger assemblies that may be located beneath the production casing hanger assembly. During production the seal between the production casing hanger and the high pressure wellhead housing may be more critical than the seal(s) between the one or more casing hanger assemblies that are located beneath the production casing hanger assembly and thus this more critical seal may be provided by a static seal that may be more reliable than a dynamic seal.

The one or more dynamic casing hanger assemblies in the wellhead assembly may not move relative to the high pressure wellhead housing when the seal between the casing hanger and the high pressure wellhead housing is of critical importance, e.g. during installation stages. There may be no movement for example because there are no thermal gradients during these stages that cause well growth. However, at the stage at which the one or more dynamic casing hanger assemblies in the wellhead assembly do move relative to the high pressure wellhead housing, the seal between the casing hanger and the high pressure wellhead housing may no longer be of critical importance, e.g. due to cement that has been added to the system and/or due to the presence of higher casing hanger assemblies that provide the primary seal. Thus at this stage, e.g. during production, whilst a dynamic seal may be less reliable than a static seal, it may not matter.

The wellhead assembly may comprise at least one static casing hanger assembly (and thus at least one static seal). This seal may act as the, or part of a, primary (i.e. main and/or critical) seal against the high pressure wellhead housing.

If at a later stage, e.g. during later additional or remedial work on the well such as during retrieval, recompletion and/or testing of the wellhead assembly after production, the seal of a dynamic casing hanger assembly to the high pressure wellhead housing is of critical importance, an additional seal may be provided between the casing hanger assembly and the high pressure wellhead housing.

The production casing hanger assembly may support production casing and may hold the production casing in a fixed position relative to the high pressure wellhead housing.

The wellhead assembly may have a device to index the correct setting height for the production casing hanger and/or the tubing hanger. This device may be a load shoulder (which may for example be installable or integral with the high pressure wellhead housing) on which the production casing hanger and/or the tubing hanger is supported.

The device to index the correct setting height may be a running tool that indexes off the BOP orientation pin and/or any other known elevation mark within the overall wellhead, BOP and drilling system.

The production casing hanger may be sealed to the high pressure wellhead housing by a production casing hanger pack-off assembly.

In the case that the production casing hanger is a fixed casing hanger the production casing hanger pack-off assembly may be a fixed pack-off assembly. This fixed pack-off assembly may lock the production casing hanger to the high pressure wellhead housing. The fixed pack-off assembly may comprise a metallic seal and/or elastomeric seal.

The production casing hanger assembly (i.e. production casing hanger, pack off and seal) may all be conventional components.

Having a production casing hanger pack-off assembly with a metal seal may allow the production casing hanger to act as a primary seal for hydrocarbons in the case of annulus gas injection (gas lift).

The production casing hanger assembly may be separated from one or more intermediate and/or dynamic casing hangers/hanger assemblies by a well growth expansion space.

The production casing hanger assembly may be landed on and/or supported by a production casing hanger landing device (e.g. landing shoulder). This landing shoulder may be referred to as an upper landing device.

The wellhead assembly may comprise a lower landing device for supporting one or more dynamic casing hanger assemblies and an upper landing device that is for supporting one or more fixed components such as the production casing hanger assembly (if it is a fixed casing hanger assembly) and/or production equipment such as a tubing hanger or a Christmas tree.

The production casing hanger landing device may be an installable device that is locked to the high pressure wellhead housing.

The production casing hanger landing device may be installed after the intermediate casing hanger assembly(ies) are installed in the high pressure wellhead housing. Thus, the intermediate casing hanger(s)/intermediate casing hanger assembly(ies) may have a maximum outer diameter that is greater than the minimum inner diameter of the installable landing device. This means that existing wellhead intermediate casing hangers/intermediate casing hanger assemblies may be used and their dimensions do not need to be changed so that they can fit through the landing device, i.e. standard dimension components can be used.

The production casing hanger landing device may be a device that is integral with, or part of, the high pressure wellhead housing.

In this case, casing hanger(s)/casing hanger assembly(ies) that in use are located below the production casing hanger landing device may have a maximum outer diameter that is the same size or smaller than the minimum inner diameter of the production casing hanger landing device.

The production casing hanger assembly may be a dynamic casing hanger assembly, i.e. a casing hanger assembly that allows relative movement between the supported casing and the high pressure wellhead housing. This may be, as discussed above, a casing hanger that can move relative to the high pressure wellhead housing and/or a casing hanger that permits the casing to move relative to the casing hanger to accommodate thermal well growth. In this case, a well growth expansion space may be located adjacent to, above and/or within the dynamic production casing hanger assembly.

When the production casing hanger may not be in a fixed position relative to the top of the high pressure wellhead housing, it may be desirable to provide a landing device for completion equipment, such as a tubing hanger. This is to ensure that there is a standard interface for the completion equipment within the wellhead assembly.

The landing device for the completion equipment may be (similarly to the above described production casing hanger landing device) installable (e.g. installed after the casing hanger(s) are installed) or integral with the high pressure wellhead housing. This landing device may be referred to as an upper landing device.

A casing (which may be referred as a casing string) may be suspended from each casing hanger. When a casing string is suspended from a casing hanger that allows the casing to move relative to the high pressure wellhead housing, thermal growth experienced by the casing may be accommodated. The wellhead assembly may comprise a plurality of concentric casing strings, each of which is suspended from a corresponding casing hanger.

The wellhead assembly may be used with any type of subsea or surface X-mas tree.

The wellhead assembly may be a wellhead assembly that is for use with a vertical Christmas tree (VXT). The wellhead assembly may be a wellhead assembly that is for use with a horizontal Christmas tree (HXT).

Conventionally each casing hanger is landed on the subsequent casing hanger. For VXT systems, the tubing hanger lands in the production casing hanger and is locked firmly to the high pressure wellhead housing. With HXT systems the set-up is somewhat different with respect to the tubing hanger which lands in the XT, but the casing and casing hangers follows the same principle for both types of XT systems.

In the present invention there may be a vertical space (well growth expansion space) between the dynamic casing hanger(s) and fixed casing hanger(s) or other fixed equipment such as production equipment e.g. landing device, tubing hanger, XT etc.

In the present invention there may be a vertical space (well growth expansion space) between the casing hangers and tubing hanger (for VXT systems) or XT (for HXT systems), between the intermediate casing hangers and the production casing hanger (if the production casing hanger is a fixed casing hanger) or within one or more casing hanger/casing hanger assembly.

The wellhead assembly may comprise a structural support, e.g. a foundation. Particularly in a subsea well, the structural support may be a suction anchor and/or another seabed structure.

In the case of an assembly with a suction anchor, the suction anchor may provide structural support for the rest of the wellhead assembly and/or high pressure wellhead housing. When the structural support of the wellhead assembly is a suction anchor, the high pressure wellhead housing may be directly connected to the suction anchor.

The present invention may be particularly useful in an arrangement with a suction anchor that acts as a structural support, for example for the high pressure wellhead housing (i.e. the suction anchor may be rigidly locked to the high pressure wellhead housing). This is because a suction anchor in use may be very firmly and/or rigidly connected to the surrounding environment. As a result there may be very little flexibility in the assembly to accommodate well growth. An arrangement in which one or more casings can move relative to the high pressure wellhead housing may provide a convenient way of accommodating well growth.

In one example the wellhead assembly may comprise a plurality (such as three) intermediate dynamic casing hanger assemblies and a fixed production casing hanger assembly that is supported on an installable landing device. There may be a well growth expansion space between the uppermost intermediate dynamic casing hanger and the fixed production casing hanger and/or within each dynamic casing hanger assembly. For a VXT system a fixed tubing hanger may be supported by the production casing hanger. This example is not dependent on the tubing hanger being present and could equally be utilised for completions with HXT.

This embodiment may require minimal modification of existing wellhead system components and the casings used may be within the current envelope of standard tubular sections/diameters.

In another example, the wellhead assembly may comprise a plurality (such as three) intermediate dynamic casing hanger assemblies, and a fixed production casing hanger assembly supported by an integrated landing shoulder. There may be a well growth expansion space between the uppermost intermediate dynamic casing hanger and the fixed production casing hanger and/or within each intermediate dynamic casing hanger assembly. For a VXT system, a fixed tubing hanger may be supported by the production casing hanger. This example is not dependent on the tubing hanger being present and could equally be utilised for completions with a HXT.

This example may require modification of existing wellhead system components as the maximum outer diameter of the intermediate casing hangers/intermediate casing hanger assemblies may have to be reduced in diameter to allow them to fit through the integrated upper landing shoulder. Alternatively or additionally, the high pressure wellhead housing may have a reduced wall thickness so as to be able to accommodate a larger production casing hanger assembly and tubing hanger diameter (that may land on a wider than normal landing shoulder) so as to allow standard sized intermediate casing hanger assemblies to fit therethrough.

In yet another example, the wellhead assembly may comprise a plurality (such as two) intermediate dynamic casing hanger assemblies and a dynamic production casing hanger assembly. For VXT systems, the wellhead assembly may comprise a fixed tubing hanger assembly supported by an integrated landing shoulder. This example is not dependent on the tubing hanger being present and could equally be utilised for completions with a HXT.

This example may require slimmer casing hanger assemblies to land on a narrower landing shoulder than conventional casing hanger assemblies in order to clear the upper integrated landing shoulder for the tubing hanger. Alternatively or additionally, the high pressure wellhead housing may have a reduced wall thickness to accommodate regular casing hanger assemblies landing on a normal (lower) landing shoulder.

Figure 2:
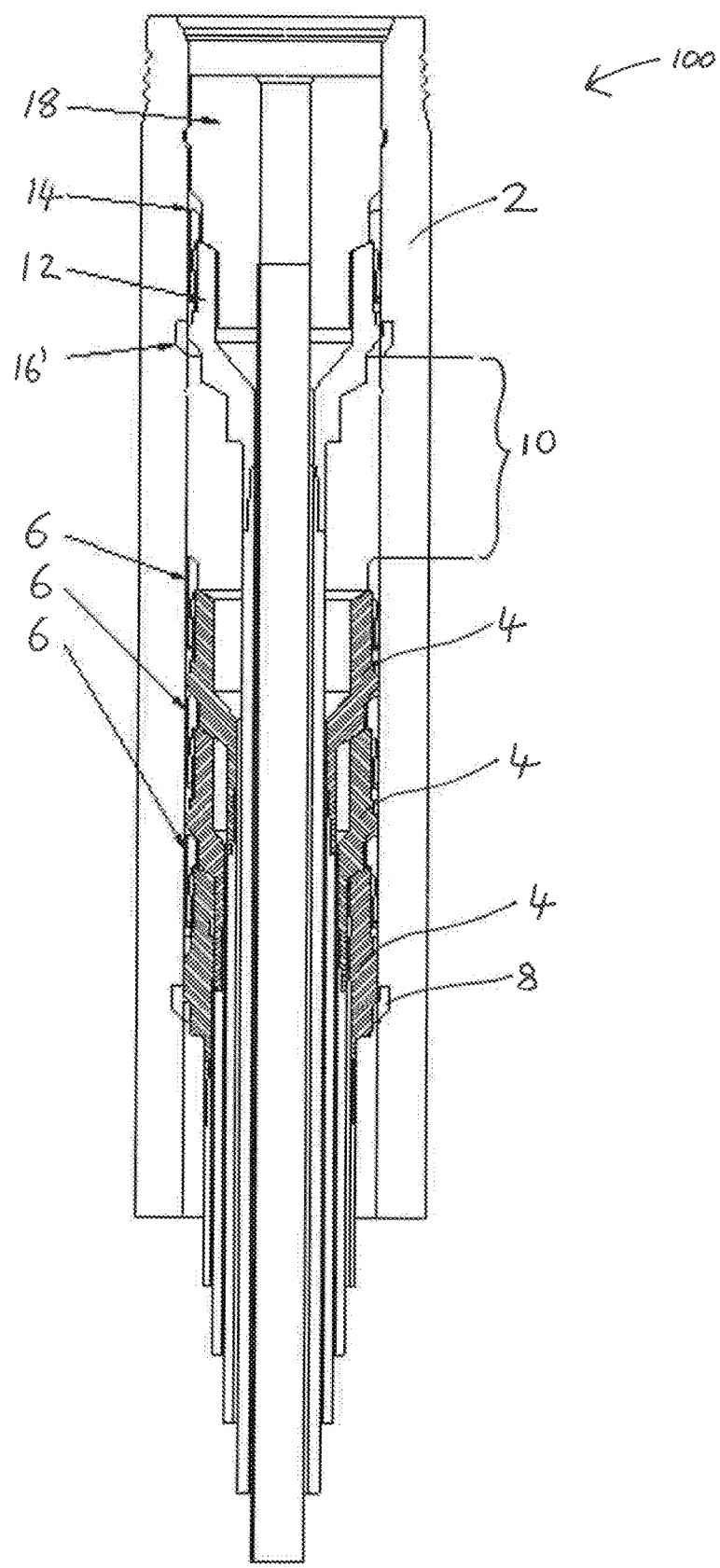
Figure 3:
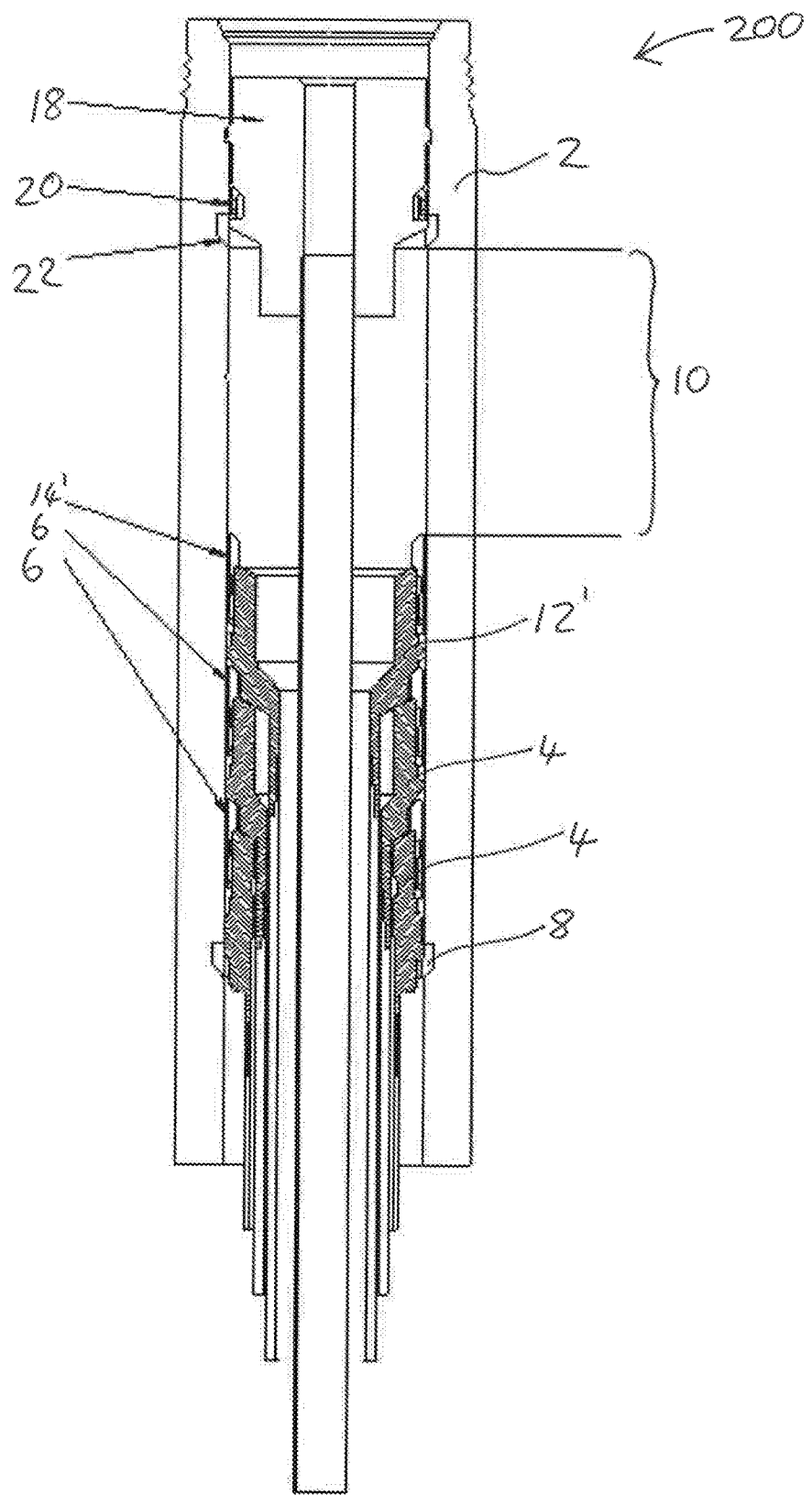
Figure 4:
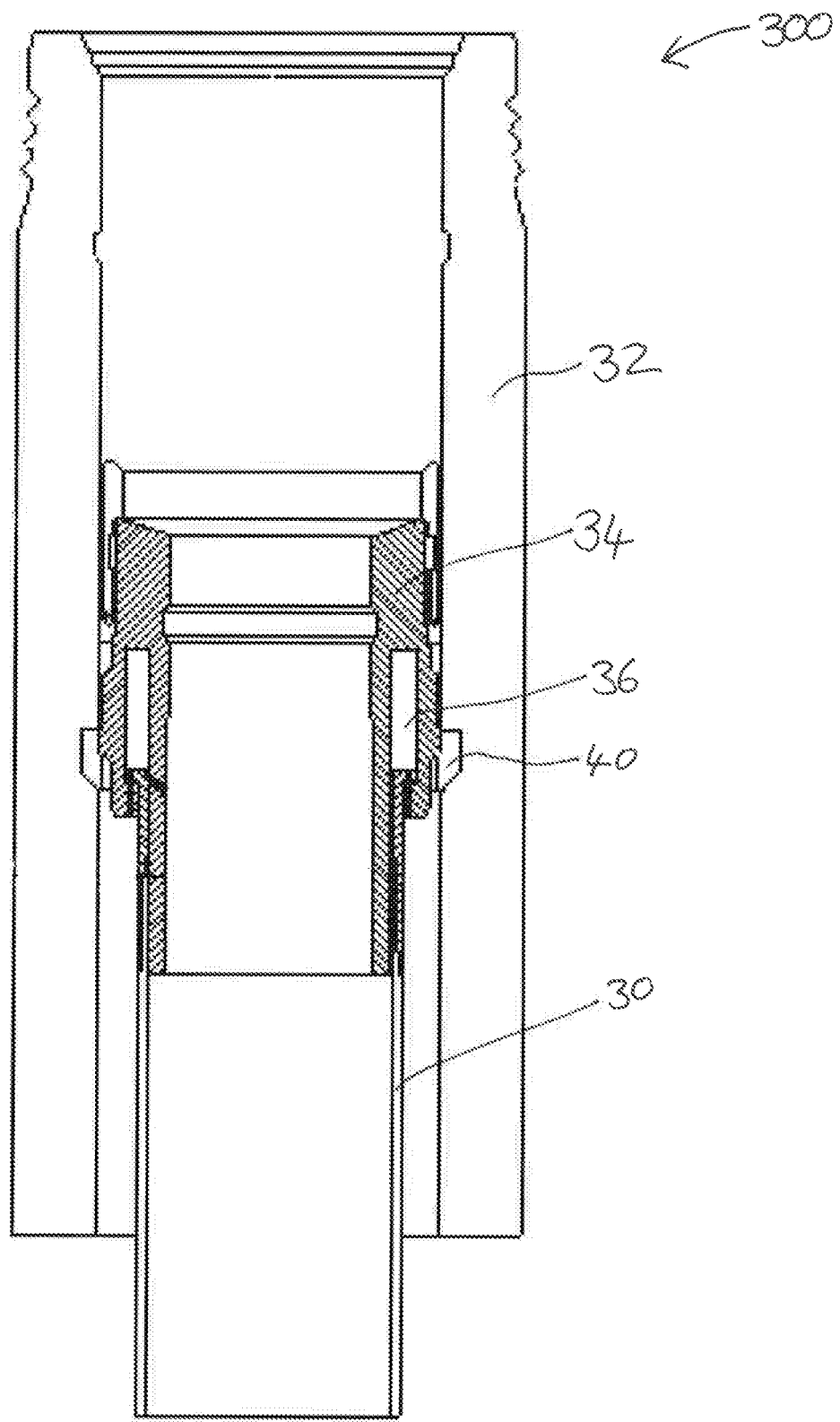

Certain preferred embodiments of the present invention will now be described by way of example only with reference to the accompanying drawings, in which:

FIG. 1 shows a first wellhead assembly;
FIG. 2 shows a second wellhead assembly;
FIG. 3 shows a third wellhead assembly; and
FIG. 4 shows a fourth wellhead assembly.

FIG. 1 shows a wellhead assembly 1. The wellhead assembly 1 comprises a high pressure wellhead housing 2. Within the high pressure wellhead housing 2 are a plurality (in this case three) intermediate casing hangers 4. Each intermediate casing hanger is sealed to the high pressure wellhead housing 2 by a pack-off assembly 6. Each casing hanger 4 suspends a casing.

The lowermost intermediate casing hanger 4 (i.e. the intermediate casing hanger closest to the reservoir) is supported on a lower landing device 8. The lower landing device 8 is located on, fixed to, integrated with, part of, located in etc. the high pressure wellhead housing 2.

The intermediate casing hangers 4 are stacked and supported on each other on top of the lowermost intermediate casing hanger 4 that is supported on the lower landing device 8.

In this example assembly, the intermediate casing hangers 4 are arranged so that they are able to move relative to the high pressure wellhead housing 2 to allow relative movement between the casings and the high pressure wellhead housing. This may be so as to accommodate thermal growth experienced by the wellhead assembly 1 during use. So as to allow such movement there is a well growth expansion space 10 immediately above the uppermost intermediate casing hanger 4.

In this example, each pack-off assembly 6 is a dynamic pack-off assembly that is designed to allow relative movement between the dynamic casing hanger 4 and the high pressure wellhead housing 2. Each pack-off assembly 6 may comprise an elastomeric seal to allow such movement between the casing hanger 4 and the high pressure wellhead housing 2 whilst maintaining the integrity of the seal.

The wellhead assembly 1 also comprises a production casing hanger 12 within the high pressure wellhead housing 2. In this example the production casing hanger 12 is a fixed casing hanger that is sealed and locked to the high pressure wellhead housing 2. The production casing hanger 12 is sealed and locked to the high pressure wellhead housing 2 by a production casing pack-off assembly 14.

The production casing hanger 12 is supported and held in place on an upper landing device 16. In this example the upper landing device 16 is an installable landing shoulder. This is a separate component from the high pressure wellhead housing 2 and may be installed and attached to high pressure wellhead housing after the intermediate casing hangers 4 are located within the high pressure wellhead housing 2. This means that the intermediate casing hangers 4 can have an outer diameter that is larger than the minimum inner diameter of the upper landing device 16.

A tubing hanger 18 that supports tubing for the well is supported in the production casing hanger 12. The tubing hanger 18 is locked to the high pressure wellhead housing 2.

The presence of the tubing hanger 18 indicates that this is a wellhead assembly 1 that is to be completed with a vertical Christmas tree. However, the tubing hanger is not essential and the wellhead assembly and the concept of having dynamic casing hangers could equally be used for completions with a horizontal Christmas tree.

FIG. 2 shows a second wellhead assembly 100. This wellhead assembly 100 is substantially the same as the wellhead assembly 1 of FIG. 1 except the production hanger 12 is landed on an upper landing device 16' that is integral with the high pressure wellhead housing 2.

The same reference numerals are used for components that are the substantially the same as the corresponding component shown in FIG. 1. Thus, except for features that are explained as being different, the above description of the features of FIG. 1 applies equally to the features of FIG. 2.

Due to the fact that the upper landing device 16' is integral with the high pressure wellhead housing 2, the maximum outer diameter of the intermediate dynamic casing hangers 4 may need to be the same as or smaller than the minimum inner diameter of the upper landing device 16'. This is because the intermediate casing hangers 4 may need to be installed through the upper landing device 16' that is integral with the high pressure wellhead housing 2.

FIG. 3 shows a third wellhead assembly 200. This wellhead assembly 200 is substantially the same as the wellhead assembly 1 of FIG. 1 except the production hanger 12' is a dynamic casing hanger rather than a fixed casing hanger. As a result the production hanger pack-off assembly 14' is a dynamic pack-off assembly. In this example there are only two intermediate casing hangers 4 (rather than three as shown in FIGS. 1 and 2). Rather than being landed in the production casing hanger, the tubing casing hanger is landed on an upper landing device 22. This upper landing device may be installable in the high pressure wellhead housing 2 after the intermediate casing hangers 4 and the production casing hanger 12' have been installed or it may be integral with the high pressure wellhead housing 2. The tubing hanger 18 is fixed and locked to the high pressure wellhead housing 2 and is sealed thereto using a seal assembly 20.

In this example the well growth expansion space 10 is located above the production casing hanger 12'. This is because the production casing hanger 12' is a dynamic casing hanger and as such needs to have a void it can expand into to allow the wellhead assembly 200 to accommodate well growth.

The well growth expansion space 10 may be immediately above the uppermost dynamic casing hanger. This is so that the dynamic casing hangers have a void they can move into when the well is subjected to well growth.

The same reference numerals are used for components that are the substantially the same as the corresponding component shown in FIG. 1. Thus, except for features that are explained as being different, the above description of the features of FIGS. 1 and 2 applies equally to the features of FIG. 3.

FIG. 4 shows an alternative wellhead assembly 300. In this assembly 300 the casing 30 can move relative to the high pressure wellhead housing 32 due to the fact that the casing 30 can move relative to the casing hanger 34.

The casing 30 seals to the casing hanger 34 and can move relative thereto due to the presence within the casing hanger 34 of the well growth expansion space 36. The well growth expansion space 36 may be filled with air and/or may be filled with a flexible material such as rubber or an elastomer.

The casing hanger 34 is sealed to the high pressure wellhead housing 32 by pack off element 38 and is supported on landing shoulder 40.

The casing hanger 34 may be fixed relative to the high pressure wellhead housing 32 or may be able to move relative to the high pressure wellhead housing 32.

The casing hanger 34 with a well growth expansion space 36 therein may be used in the example wellhead assemblies shown in FIG. 1, 2 or 3. Any of the dynamic casing hangers shown in FIGS. 1, 2 and 3 may be a casing hanger with a well growth expansion space therein of the type shown in FIG. 4.

In the present invention one or more casing string(s) may move relative to the high pressure wellhead housing to accommodate well growth. This may be by virtue of casing hangers that can move relative to the high pressure wellhead housing and/or by virtue of the casing string being able to move relative to the casing hanger supporting it.

The invention claimed is:

1. A wellhead assembly, the wellhead assembly comprising:
   a high pressure wellhead housing;
   a casing hanger assembly located within the high pressure wellhead housing; and
   a casing having an upper end, the upper end of the casing being supported by the casing hanger assembly,
   wherein the casing hanger assembly is arranged so that the upper end of the casing is able to move axially in opposite directions relative to the high pressure wellhead housing after the casing hanger assembly is installed and during use of the wellhead assembly in drilling or production operations, and the wellhead assembly comprises an expansion space for allowing the axial movement of the upper end of the casing relative to the high pressure wellhead housing.

2. A wellhead assembly as claimed in claim 1, wherein the casing hanger assembly is arranged so that it is able to move relative to the high pressure wellhead housing to allow the relative movement between the upper end of the casing and the high pressure wellhead housing.

3. A wellhead assembly as claimed in claim 1, wherein the casing hanger assembly is arranged so that the upper end of the casing is able to move relative to the casing hanger assembly to allow the relative movement between the upper end of the casing and the high pressure wellhead housing.

4. A wellhead assembly as claimed in claim 1, wherein the expansion space is within the high pressure wellhead housing and is a space into which the casing hanger assembly can move.

5. A wellhead assembly as claimed in claim 1, wherein the expansion space is within the casing hanger assembly and is a space into which the upper end of the casing can move.

6. A wellhead assembly as claimed in claim 1, wherein the casing hanger assembly comprises a dynamically tolerant seal.

7. A wellhead assembly as claimed in claim 1, wherein the wellhead assembly comprises a plurality of casing hanger assemblies that are arranged so that they are able to allow relative movement between a casing it supports and to the high pressure wellhead housing, and wherein the plurality of casing hanger assemblies that are arranged so that they are able to move are supported on each other.

8. A wellhead assembly as claimed in claim 1, wherein the well head assembly comprises a plurality of casing hanger assemblies, and at least one of the casing hanger assemblies is arranged so that the upper end of the casing is able to move relative to the high pressure wellhead housing, and
   wherein the expansion space is adjacent to the uppermost casing hanger assembly that is arranged so that its respective casing is able to move relative to the high pressure wellhead housing.

9. A wellhead assembly as claimed in claim 1, wherein the wellhead assembly comprises a production casing hanger assembly.

10. A wellhead assembly as claimed in claim 9, wherein the production casing hanger assembly is fixed relative to the high pressure wellhead housing.

11. A wellhead assembly as claimed in claim 9, wherein the production casing hanger assembly is supported by a production casing hanger landing device.

12. A wellhead assembly as claimed in claim 11, wherein the production casing hanger landing device is an installable device that is locked to the high pressure wellhead housing.

13. A wellhead assembly as claimed in claim 1, wherein the wellhead assembly comprises a suction anchor that provides structural support to the high pressure wellhead housing.

14. A wellhead assembly as claimed in claim 1, wherein the wellhead assembly is part of a production well.

15. A method of accommodating well growth in a wellhead assembly, wherein the method comprises using the wellhead assembly of claim 1.

16. A method of providing a wellhead assembly, the method comprising:
   providing a high pressure wellhead housing;
   providing a casing hanger assembly;
   providing a casing having an upper end, the upper end of the casing being supported by the casing hanger assembly; and
   wherein the casing hanger assembly within the high pressure wellhead housing is arranged such that when the casing hanger assembly is installed in the high pressure wellhead housing the upper end of the casing supported on the casing hanger assembly is able to move axially in opposite directions relative to the high pressure wellhead housing after the casing hanger assembly is installed and during the use of the wellhead assembly in drilling or production operations, and the wellhead assembly comprises an expansion space for allowing the axial movement of the upper end of the casing relative to the high pressure wellhead housing.

17. The method according to claim 16, wherein the wellhead assembly comprises:
- the high pressure wellhead housing;
- the casing hanger assembly located within the high pressure wellhead housing; and
- the casing having the upper end, the upper end of the casing being supported by the casing hanger assembly,
- wherein the wellhead assembly is arranged so that the upper end of the casing is able to move relative to the high pressure wellhead housing after the casing hanger assembly is installed and during the use of the wellhead assembly in drilling or production operations.

\* \* \* \* \*